(12) United States Patent
Lin

(10) Patent No.: US 8,080,893 B2
(45) Date of Patent: Dec. 20, 2011

(54) TIDAL POWER GENERATION DEVICE

(76) Inventor: Tso-Tung Lin, Kaohsiung Hsien (TW)

( * ) Notice: Subject to any disclaimer, the term of this patent is extended or adjusted under 35 U.S.C. 154(b) by 495 days.

(21) Appl. No.: 12/326,911

(22) Filed: Dec. 3, 2008

(65) Prior Publication Data

US 2010/0133842 A1 Jun. 3, 2010

(51) Int. Cl.
*F03B 13/12* (2006.01)
(52) U.S. Cl. ............................................. 290/53; 290/42
(58) Field of Classification Search .................. 290/42, 290/53; 415/7, 151, 3.1; 60/504
See application file for complete search history.

(56) References Cited

U.S. PATENT DOCUMENTS

| | | | | |
|---|---|---|---|---|
| 3,644,052 A | * | 2/1972 | Lininger | 415/7 |
| 3,687,567 A | * | 8/1972 | Lininger | 415/7 |
| 3,828,557 A | * | 8/1974 | Mochel | 60/503 |
| 4,170,738 A | * | 10/1979 | Smith | 290/42 |
| 5,240,383 A | * | 8/1993 | Ames | 417/61 |
| 5,405,250 A | * | 4/1995 | Vowles et al. | 417/331 |
| 5,921,082 A | * | 7/1999 | Berling | 60/325 |
| 6,711,897 B2 | * | 3/2004 | Lee | 60/507 |
| 7,329,963 B2 | * | 2/2008 | Omer | 290/54 |
| 7,536,859 B2 | * | 5/2009 | Tai et al. | 60/497 |

* cited by examiner

*Primary Examiner* — Tulsidas C Patel
*Assistant Examiner* — Stefan Mikailoff
(74) *Attorney, Agent, or Firm* — Leong C. Lei

(57) ABSTRACT

A tidal power generation device includes at least a chassis, a rail frame, and a chain support rack. A driver is provided at an end of the rail frame. The driver includes a connection bar. The chain support rack is set on the chassis and includes toothed wheels that support and operatively couple a chain that is coupled to the connection bar. One of the toothed wheels has a shaft that is supported by a one-way bearing and is operatively coupled to a first transmission axle by mated gears. The first transmission axle drives a second transmission axle, which is coupled to a dynamo. The driver is caused to move frontward by sea waves for driving the first transmission axle through the chain and the toothed wheels, so as to cause the rotation of the second transmission axle for transmitting torque to the dynamo to generate electricity.

10 Claims, 7 Drawing Sheets

TIDAL POWER GENERATION DEVICE

TECHNICAL FIELD OF THE INVENTION

The present invention relates generally to a method for operating an air mattress pressure controller and a structure thereof, and particularly to a low cost regulation method for efficiently adjusting parameters for effecting air charging for an air mattress and an air mattress pressure controller constructed on the basis of the method.

DESCRIPTION OF THE PRIOR ART

The earth natural resources are being depleted. The fossil energy that has been long relied upon by the human society is over-consumed and may get used up earlier than expected.

A solution to the depletion of the fossil energy is to develop new energies. However, no breakthrough has emerged so far. Thus, more complete exploitation of the current natural energy resources is a more feasible and practical way for the time being. An example is to develop new sources for supplying of electricity.

Traditionally, the mainstream sources of electricity are obtained with thermal power generation, hydraulic power generation, wind power generation, and even nuclear power generation, among which the thermal power generation is effected by combusting coals, which is not economic for areas where no coal mine is present and which causes severe air pollution. Nuclear power generation is considered a high technique field, which poses certain obstacles to low technique countries and may be subject to severe potential risks of radioactive pollution. Thus, wind power generation and hydraulic power generation are the most acceptable options to most of the countries of the world.

Both wind power generation and hydraulic power generation require a turbine that is rotated by wind power or hydraulic power to drive a dynamo for generating electricity. Hydraulic power generation requires a dam to retain water, and this is extremely expensive and is limited in lifespan. The most advanced technique for generating electricity is to retrieve kinetic energy from waves of seas or oceans. Since sea waves are generated naturally, the kinetic energy of sea waves is almost unlimited. However, although the movement of sea waves is seemingly in a fixed direction, the actual movement of sea waves is practically a linear forth-and-back motion. Conventional turbines are set at a fixed orientation and the blades of the conventional turbines are arranged at fixed inclined angles, both factors making it impossible to perfectly align the turbine with the moving direction of sea waves.

SUMMARY OF THE INVENTION

Thus, an objective of the present invention is to provide a tidal power generation device, which includes at least a chassis, a rail frame, and a chain support rack. The rail frame is set at one side of the chassis in an inclined fashion. A driver arranged on the rail frame at an end thereof includes a connection bar and a float arranged at a front side thereof. The chain support rack is mounted on the chassis and the chain support rack is set in an inclined fashion. Two toothed wheels are respectively mounted to opposite end portions of the chain support rack for supporting and operative coupling with a chain. The connection bar of the driver is coupled to the chain. The low-side toothed wheel has a centrally arranged shaft that is supported by a one-way bearing and operatively coupled to a first transmission axle through mated gears mounted to the shaft and the first transmission axle. The first transmission axle is in operative coupling with and drives a second transmission axle, which is coupled to a dynamo. By installing the power generation device at a sea shore to allow the driver to be forced by sea waves to advance frontward, the connection bar is moved frontward to cause movement of the chain, which in turns drives rotation of the toothed wheels and the shaft, whereby the gear of the shaft drives the first transmission axle, which in turn drives the second transmission axle to operate the dynamo for generating electricity.

The foregoing objective and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
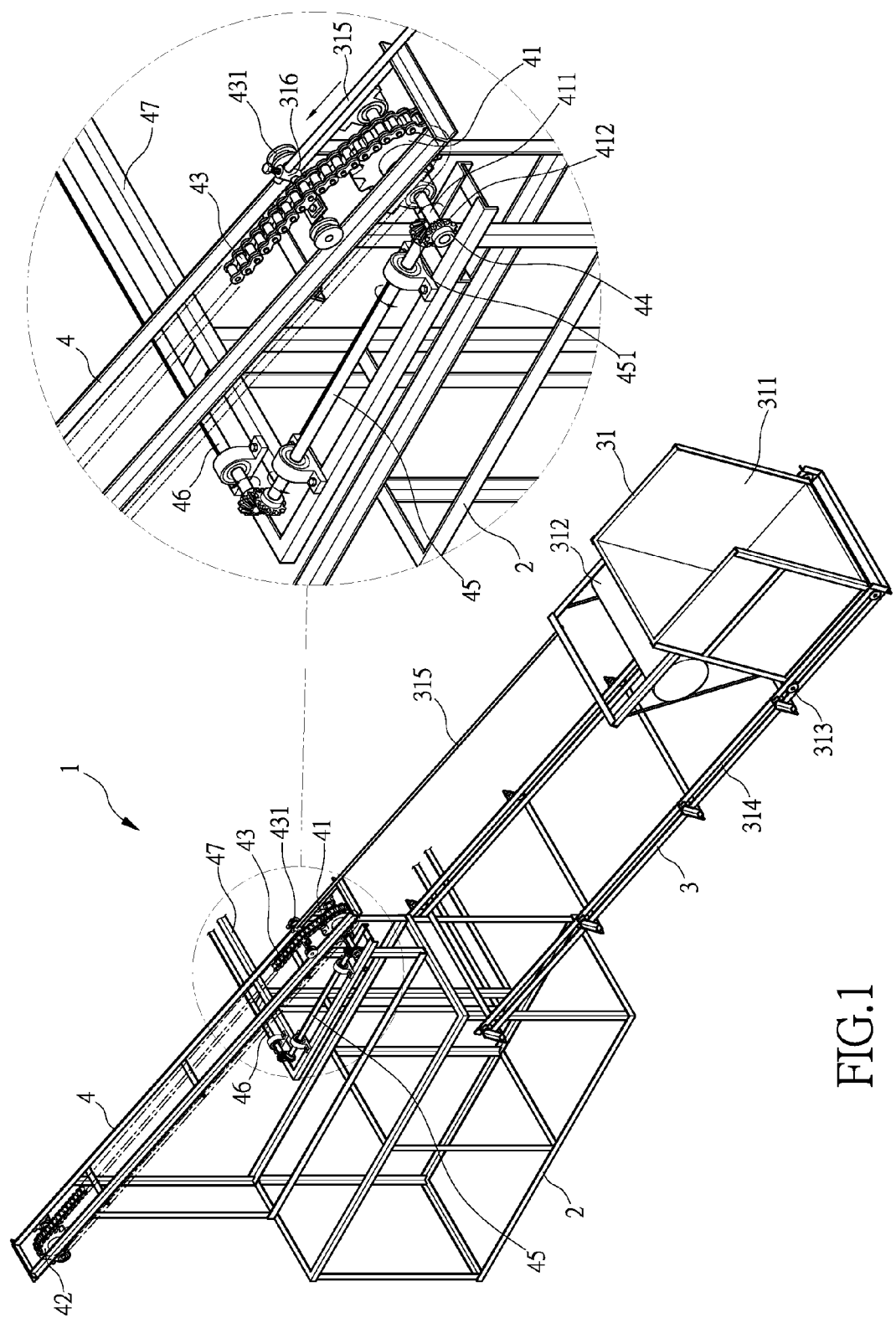
FIG. 1 is a perspective view of a tidal power generation device constructed in accordance with the present invention.

With reference to the drawings and in particular to FIG. 1, a tidal power generation device 1 constructed in accordance with the present invention comprises at least a chassis 2, a rail frame 3, and a chain support rack 4.

The chassis 2, which serves as a base, connects and supports the rail frame 3 and the chain support rack 4.

The rail frame 3 is set at one side of the chassis 2 and extends from the chassis 2 in a downward inclined direction. The rail frame 3 movably carries a driver 31 that forms an opening 311 and a float 312 set at a side of the driver 31 opposite to the opening 311. A plurality of first rollers 313 is mounted to a bottom of the opening 311. The first rollers 313 are movably received in rail slots 314 defined in the rail frame 3. The rail slots 314 properly position the driver 31. A connection bar 315 extends from a front side of the driver 31 and has a free distal front end to which a connector 316 is mounted. The connector 316 is operatively coupled to a chain 43.

Figure 2:
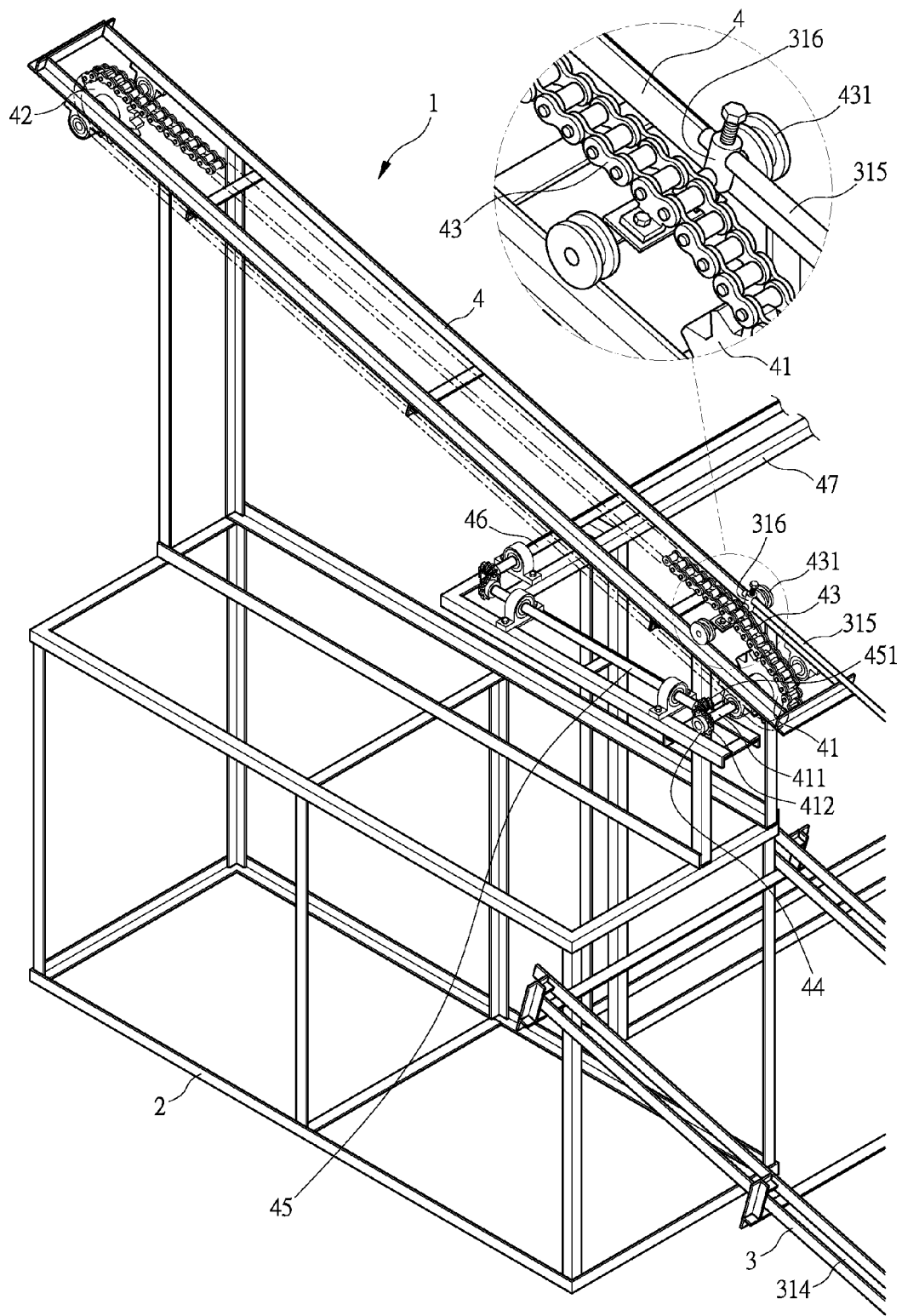
FIG. 2 illustrates an enlarged view of a chassis and a chain support rack of the tidal power generation device in accordance with the present invention.
Figure 3:
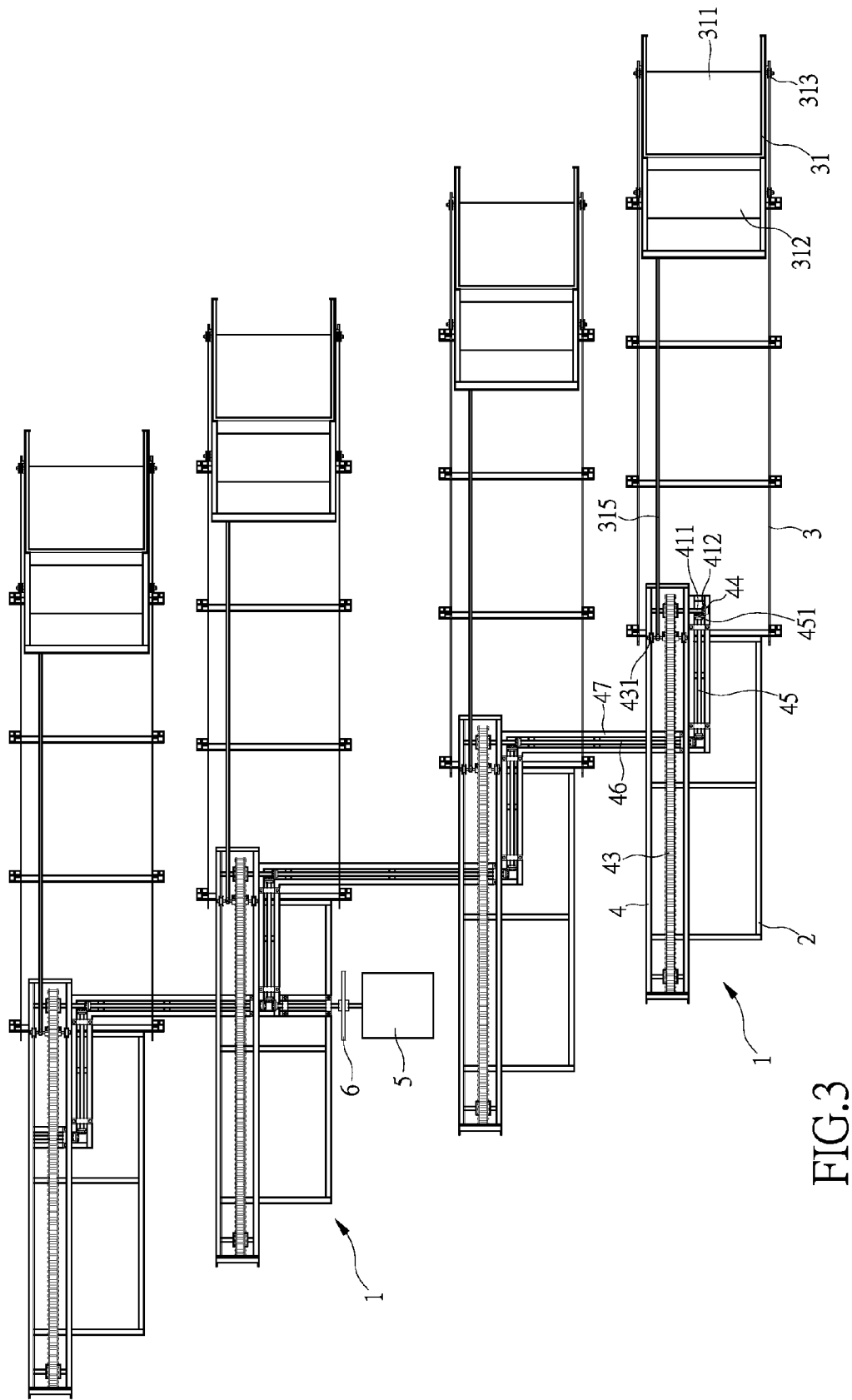
FIG. 3 is a plan view showing a layout of an application of the tidal power generation device in accordance with the present invention.

As shown in FIG. 2, the chain support rack 4 is set on a top of the chassis 2 in an inclined arrangement. Opposite end portions of the chain support rack 4 are respectively provided with toothed wheels, respectively referred to as low-side wheel 41 and high-side wheel 42. The toothed wheels 41, 42 are operatively coupled to the chain 43 to be driven thereby and interconnecting with each other. A second roller 431 is mounted under the connection between the chain 43 and the connector 316 of the connection bar 315, for also providing a support to the connection bar 315 that is located beside the chain 43, and is reciprocally movable along the chain support rack 4. The low-side toothed wheel 41 has a centrally arranged shaft 411 that is mounted to the chain support rack 4 by bearings and carries a gear 412 that mates a gear 451 mounted to a first transmission axle 45. The first transmission axle 45 drives a second transmission axle 46. Both the first transmission axle 45 and the second transmission axle 46 are supported on a coupling frame 47 by bearings. The coupling frame 47 serves to couple the second transmission axle 46 to a plurality of subsequent power generation devices 1 of the same construction, such as 10-15 power generation devices 1, as illustrated in FIG. 3. The power generation devices 1 are set in a cascade stepwise arrangement, wherein one of the power generation devices 1 is coupled to a dynamo 5, preferably with a flywheel 6 coupled between the dynamo 5 and the one of the power generation devices 1 to maintain smooth and continuous operation of the dynamo 5 by means of the inertia force of the flywheel 6.

Figure 4:
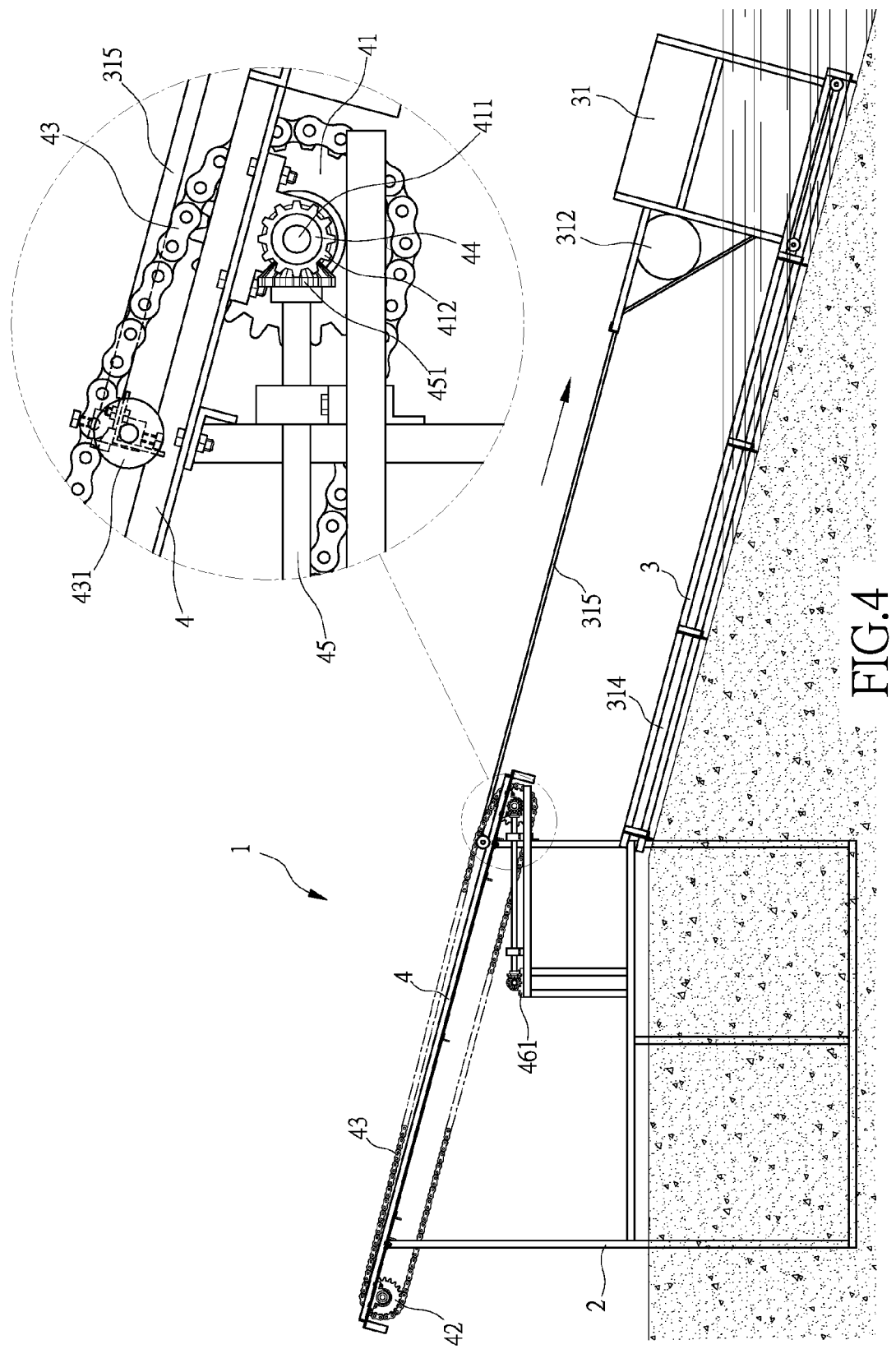
FIG. 4 is a side elevational view of the tidal power generation device of the present invention installed in a sea shore.
Figure 5:
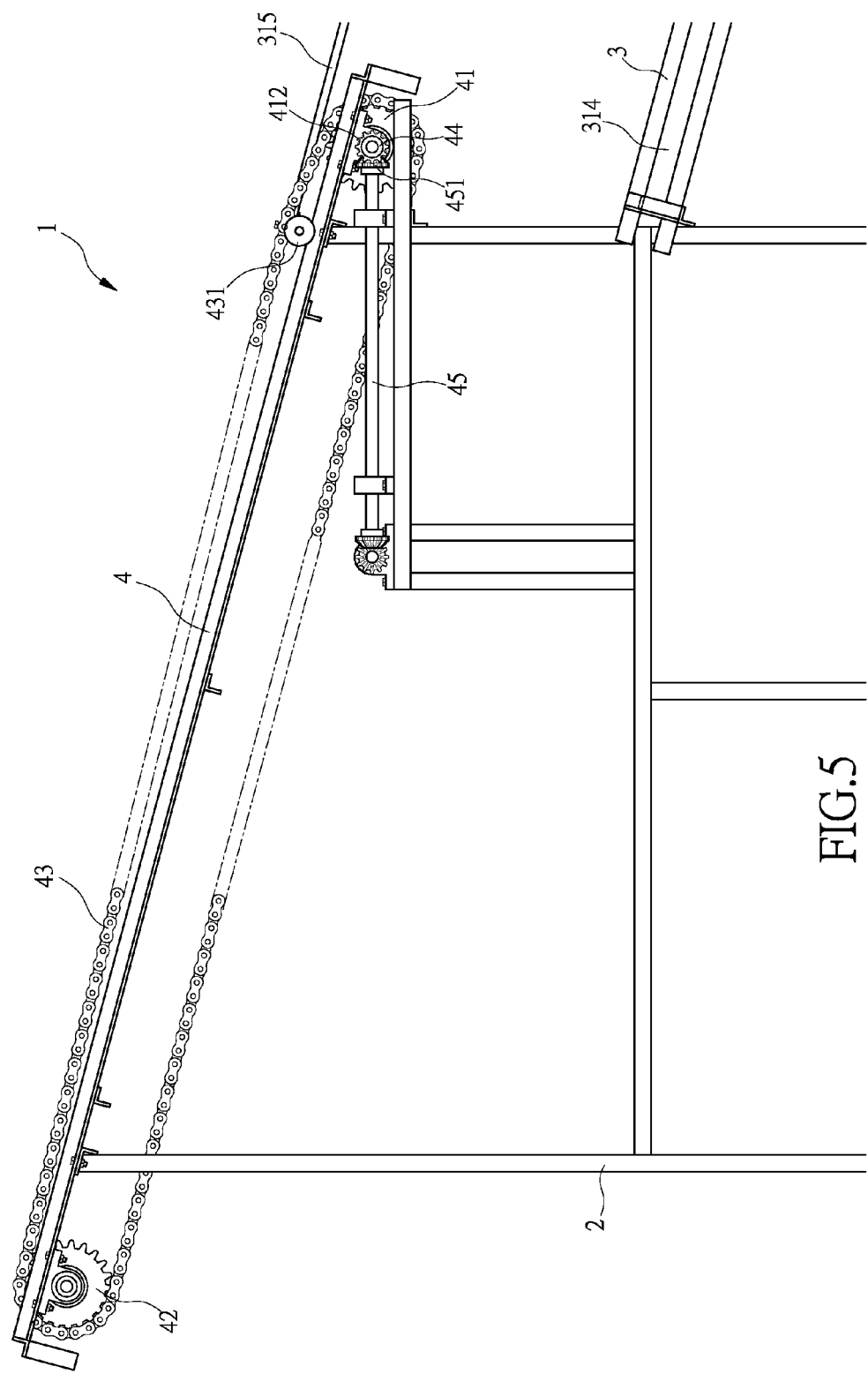
FIG. 5 is a side elevational view of the chain support rack of the tidal power generation device of the present invention.
Figure 6:
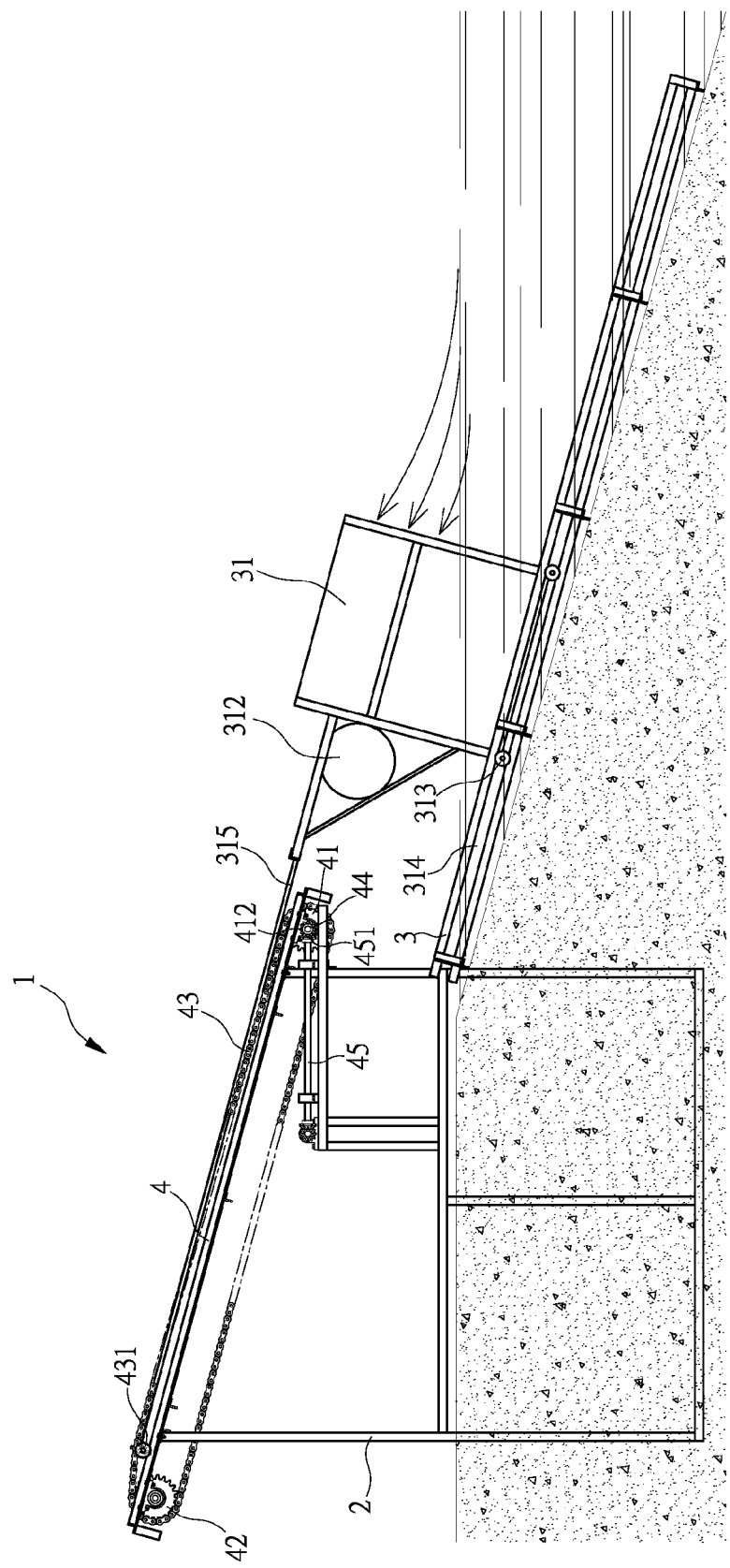
FIG. 6 is a side elevational view of the tidal power generation device of the present invention illustrating the operation thereof when a driver of the power generation device is subjected to an impact force caused by sea waves.

To practice, as shown in FIGS. 4-6, in which only one set of the power generation device 1 of the present invention is illustrated for explanation, the power generation device 1 of the present invention is installed at a sea shore with the rail frame 3 extending into the sea water. The driver 31 carried by the rail frame 3 floats on the sea water by means of the float 312. The operation of the power generation device 1 is effected by having the driver 31 receiving and driven by waves of the sea water to advance frontward. When the driver 31 advances frontward, the connection bar 315 is caused to move frontward and drives the movement of the chain 43, which in turn rotates the toothed wheel 41 about the shaft 411, whereby the gear 412 mounted to the shaft 411 causes the first transmission axle 45 to rotate and in turn drives the rotation of the second transmission axle 46. The second transmission axle 46 then transmits the torque to the next-stage power generation device 1. The remaining power generation devices 1 operate in the same way to allow the drivers 31 thereof to be pushed frontward by receiving sea waves. Ultimately, all the torques from the power generation devices 1 are transmitted to the dynamo 5, by which the dynamo 5 generates and outputs electricity.

Figure 7:
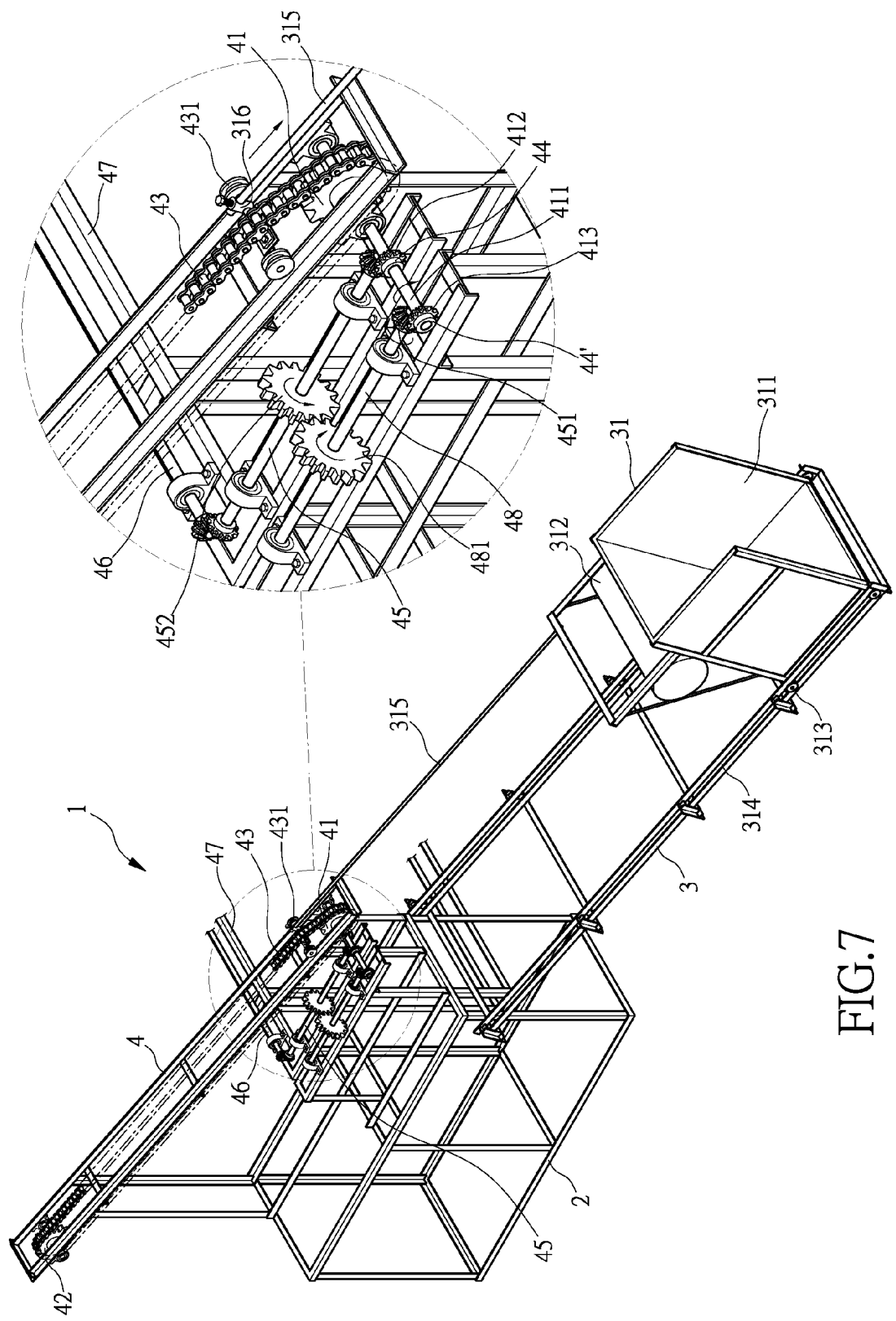
FIG. 7 is a perspective view illustrating a tidal power generation device constructed in accordance with another embodiment of the present invention.

The present invention uses sea waves to make the driver 31 of the power generation device 1 advancing frontward and when the wave retreats, the driver 31 returns to the sea surface. The shaft 411 is coupled to the chain support rack 4 by one-way bearings 44, and thus the first transmission axle 45 only rotates with the frontward movement or advancing of the driver 31 and is not rotated by the chain 43 and the toothed wheel 41 when the driver 31 is returning back to the sea surface. To maintain continuous generation of power during the time period when the driver 31 is returning to sea surface, as illustrated in FIG. 7, a third transmission axle 48 is additionally provided at a location adjacent to the first transmission axle 45. The first transmission axle 45 and the third transmission axle 48 are respectively provided with gears 452, 481 that mate each other. The shaft 411 is also provided with a gear 413 that drives the rotation of the third transmission axle 48. The gear 413 is supported by a one-way bearing 44' in such a way that the third transmission axle 48 is rotated by the gear 413 only when the driver 31 is moving back to the sea surface and the rotation of third transmission axle 48 is transmitted to the gear 452 for subsequently driving the first transmission axle 45 to rotate the second transmission axle 46 and transmitting the torque to the dynamo 5.

The effectiveness of the present invention resides in that an impact force caused by sea waves is employed to frontward advance the driver 31 of the power generation device 1, which in turns moves the connection bar 315 for causing the movements/rotations of the chain 43, the first transmission axle 45, and the second transmission axle 46 simultaneously to thereby apply torque to the dynamo 5. A rotor of the dynamo 5 is thus rotated and electricity is generated. In this way, both electricity generation and environmental conservation can be realized at the same time.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A tidal power generation device comprising: a chassis adapted to be installed at a sea shore; a rail frame set at one side of the chassis in an inclined fashion, a driver being arranged on the rail frame and comprising a connection bar extending therefrom; and a chain support rack set on the chassis in an inclined fashion, toothed wheels being mounted to the chain support rack for supporting and operative coupling with a chain, one of the toothed wheels having a centrally arranged shaft that is supported by a one-way bearing and operatively coupled to a first transmission axle through engagement between two gears wherein one of the gears is mounted to the shaft and the other one of the gears is mounted to the first transmission axle, the first transmission axle being in operative coupling with and driving a second transmission axle; wherein the connection bar of the driver is coupled to the chain and the second transmission axle is coupled to a dynamo and wherein when waves force the driver to move in a frontward direction, the connection bar is moved frontward to cause rotations of the toothed wheels and the shaft, whereby the gear of the shaft drives the first transmission axle, which in turn drives the second transmission axle to operate the dynamo for generating electricity.

2. The tidal power generation device according to claim 1, wherein the driver forms an opening.

3. The tidal power generation device according to claim 1, wherein the driver comprises a float set at a front side thereof.

4. The tidal power generation device according to claim 1, wherein the connection bar has a front end to which a connector is mounted.

5. The tidal power generation device according to claim 1, wherein the driver is provided with first rollers on a bottom thereof.

6. The tidal power generation device according to claim 1, wherein the rail frame forms rail slots.

7. The tidal power generation device according to claim 1, wherein the chain is coupled to a second roller.

8. The tidal power generation device according to claim 1 further comprising a third transmission axle arranged adjacent to the first transmission axle.

9. The tidal power generation device according to claim 8, wherein the first transmission axle and the third transmission axle are respectively provided with gears mating each other.

10. The tidal power generation device according to claim 1, wherein a flywheel is coupled between the dynamo and the power generation device.

\* \* \* \* \*